United States Patent [19]

Ikawa et al.

[11] 4,357,087
[45] Nov. 2, 1982

[54] CAMERA INCORPORATED WITH A MOVABLE FLASH LIGHT DEVICE

[75] Inventors: Kazuo Ikawa, Tokyo; Michio Hirohata, Kawasaki; Mutsuhide Matsuda, Yokohama; Yukio Mashimo, Tokyo, all of Japan

[73] Assignee: Canon Kabushiki Kaisha, Tokyo, Japan

[21] Appl. No.: 243,253

[22] Filed: Mar. 12, 1981

Related U.S. Application Data

[63] Continuation of Ser. No. 15,641, Feb. 27, 1979, abandoned, which is a continuation of Ser. No. 830,708, Sep. 6, 1977, Pat. No. 4,153,355.

[30] Foreign Application Priority Data

Sep. 7, 1976 [JP] Japan .............................. 51-106885

[51] Int. Cl.³ ...................... G03B 7/081; G03B 15/05
[52] U.S. Cl. ..................................... 354/33; 354/128; 354/139; 354/145

[58] Field of Search ...................... 354/32, 33, 34, 35, 354/60 F, 127, 128, 139, 145, 149, 268; 315/241 P

[56] References Cited

U.S. PATENT DOCUMENTS

| | | | |
|---|---|---|---|
| 3,273,497 | 9/1966 | Jakob | 354/149 |
| 3,684,917 | 8/1972 | Uno et al. | 354/241 P X |
| 3,714,872 | 2/1973 | Mashimo et al. | 354/33 |
| 3,723,810 | 3/1973 | Mashimo | 354/145 X |
| 4,100,554 | 7/1978 | Iijima | 354/145 |

FOREIGN PATENT DOCUMENTS

48-97026 11/1973 Japan .

*Primary Examiner*—Michael L. Gellner
*Attorney, Agent, or Firm*—Toren, McGeady & Stanger

[57] ABSTRACT

In the disclosed flash camera, a flash unit is movable between protruding and stowed positions, and a sensor senses whether a capacitor that flashes the unit is adequately charged. A switch and a control circuit enable the flash only when the unit is in the protruding position and the sensor simultaneously senses an adequate charge.

8 Claims, 7 Drawing Figures

CAMERA INCORPORATED WITH A MOVABLE FLASH LIGHT DEVICE

This is a continuation of application, Ser. No. 015,641 filed Feb. 27, 1979, abandoned, which is a continuation of application, Ser. No. 830,708 filed Sept. 6, 1977, now U.S. Pat. No. 4,153,355.

BACKGROUND OF THE INVENTION

1. Field of the Invention

The present invention relates to a camera incorporating an electronic flash unit, which pops up for flash operation.

2. Description of the Prior Art

Generally speaking, there are three types in the exposure control for a camera. The first is the automatic exposure control type (AE), wherein the light from the object to be photographed is used to control the aperture value or the shutter time or both in accordance with the brightness of the object to be photographed. The second is the manual control type (manual), wherein the aperture value as well as the shutter time are selected in accordance with the judgement of the photographer himself. The third is the flash exposure control type (FA), wherein the aperture value is automatically determined in accordance with the guide number of the flash unit so as to match the distance to the subject.

Quite recently camera offering all of the above three types of operation have become available. These cameras can switch between the three photographic modes by means of a switch. Usually a flash mounted on an accessory shoe. On the other hand, a camera may incorporate a so called pop up type electronic flash unit. In such a camera, the electronic flash light device (a speed light device) is built in the camera body and popped out in accordance as needed into an operationally ready position.

In a conventional camera with a so called pop up type speed light device the daylight photographic exposure control means and the flash photographic exposure control means are connectable to the exposure device by a change over, i.e., selector means. The latter is operated along with the upward movement of the speed light device so as to connect the flash exposure control means to the exposure device, while the selector means is operated along with the downward movement of the speed light device so as to connect the daylight exposure control means to the exposure device.

A conventional flash pop-up camera sets the aperture value of the exposure device on the basis of the distance to the object to be photographed and the guide member of the flash light device, the brightness of the object being disregarded, the picture obtained is often over exposed. Often it is difficult to obtain a proper exposure. Moreover, it is impossible to change over the flash light photographic mode into the daylight photographic mode when the speed light device is in the popped up state.

SUMMARY OF THE INVENTION

A purpose of the present invention is to eliminate the above mentioned shortcomings, by connecting the daylight photographic exposure control means and the flash light photographic exposure control means to the exposure determining meas, whereby the flash light photographic exposure control means is brought into operable state only along with the upward movement of the flash light device while the flash light photographic exposure control means is brought into operable state at the time of the charge completion of the flash light device.

Another purpose of the present invention is to bring the flash light device as well as the flash light photographic exposure control means into non-operable state along with the downward movement of the flash light device.

Further another purpose of the present invention is to enable the flash light photographic exposure control means to be brought into non operable state even when the flash light device is popped up.

DESCRIPTION OF THE PREFERRED EMBODIMENT

Below the present invention will be explained in detail in accordance with the embodiments of the present invention.

Figure 1:
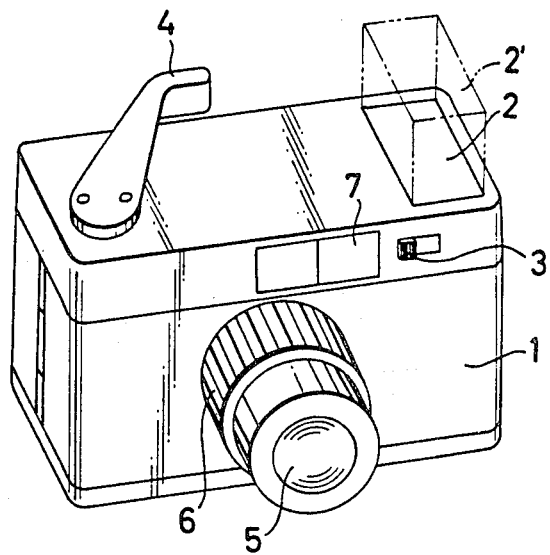
FIG. 1 shows a camera incorporated with the speed light device in accordance with the present invention in perspective view.

FIG. 1 shows a camera incorporated with the speed light device, whereby 1 is the camera body while 2 is the speed light device having a discharge tube 105 to be explained later. The speed light device is normally contained in the camera body as is shown in a solid line but is brought out of the camera body in such a manner that the discharge tube 105 assumes a position as is shown in a dotted line 2' when the speed light device is not used. 3 is the knob for popping up the speed light device. When the knob is manually slided to the right, the speed light device 2 is brought into the position shown in a dotted line 2'. 4 is the winding up lever, 5 the photographic lens, 6 the distance adjusting ring on the lens barrel and 7 the view finder window, whereby they are ordinary elements of a camera while other elements are omitted.

Figure 2:
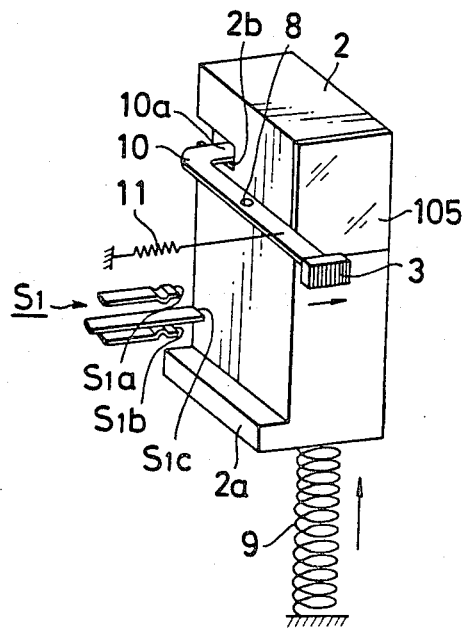
FIG. 2 shows in perspective views the speed light device shown in FIG. 1.

FIG. 2 shows in perspective view the speed light device 2 shown in FIG. 1, whereby the relation of the device 2 with the pop up operation part 3, the change over switch and so on is shown. The operation part 3 presents an arm 10 rotatably held by the fulcrum 8 provided on the camera body, being urged along the clockwise direction by means of the spring 11. When the speed light device is not used, the speed light device 2 is pushed down into the camera body, against the strength of the spring 9 provided between the device 2 and the camera body, whereby the end 10a of the arm 10 of the operation part 3 is engaged into the groove 2b provided on the speed light device 2 in such a manner that the device is held in a position 2 as is shown in a solid line in FIG. 1. When the speed light device is in the above position the abutment 2a at the lower end of the speed light device 2 is not in contact with the movable contact piece $S_{1c}$ of the change over switch $S_1$, whereby the switch $S_1$ is in contact with $S_{1b}$ and $S_{1c}$. When the pop up operation knob 3 is manually operated along the direction of the arrow out of the above state, the end 10a of the arm 10 is disengaged from the groove 2b of the speed light device body 2, whereby the speed light device body 2 is pushed up along the direction of the arrow by means of the strength of the spring 9 so as to assume the position shown in a dotted line. At this time, the abutment 2a of the speed light device body 2 is in contact with the movable contact piece $S_{1c}$ of the switch $S_1$ fixed on the camera body whereby the movable contact piece $S_{1c}$ of the switch $S_1$ is changed over from $S_{1b}$ to $S_{1a}$. Along with the change over of the switch $S_1$ the main capacitor starts to be changed from the power source of the speed light device by means of a circuit to be explained later.

Figure 3:
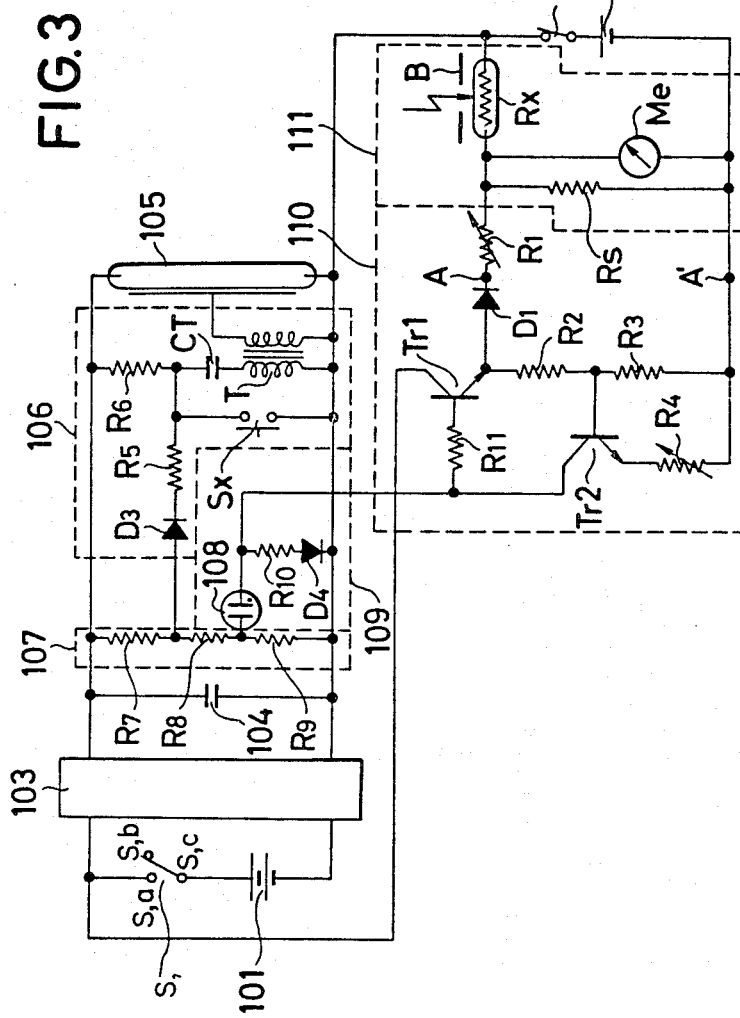
FIG. 3 shows an embodiment of the electrical circuit for the camera incorporated with the speed light device shown in FIG. 1.

FIG. 3 shows an embodiment of the electrical circuit for the camera incorporated with the speed light device in accordance with the present invention.

In the drawing, 101 is the power source for the speed light device, which source is usually a small type of battery provided in the speed light device body contained in the camera. $S_3$ is the main switch, while the power source switch $S_1$ for the speed light device corresponds to the switch $S_1$ in FIG. 2. 103 is the D.C. voltage step up circuit consisting of a conventional transistor oscillation circuit. 104 is the main capacitor whose charge is discharged through the discharge tube 105 so as to produce a flash light. 106 is the trigger circuit for the discharge tube 105, consisting of the diode $D_3$, the resistances $R_5$ and $R_6$, the trigger condenser CT, the trigger induction coil T and the synchronization contact $S_4$ to be closed along with the release operation of the camera. 107 is the voltage dividing circuit for voltage detection serving to detect the charge stage of the main capacitor 104 so as to light up the flash light preparation completion display lamp 108, consisting of the resistances $R_7$, $R_8$ and $R_9$ connected in series with each other. 109 is the circuit for producing a charge completion signal along with the lighting up of the display lamp 108, including the resistance $R_{10}$ and the diode $D_4$ beside the display lamp 108. 111 is the exposure control circuit in the camera body, consisting of a light sensing element Rx such as CdS, a meter Me and a characteristics compensating resistance Rs, whereby in front of Rx a diaphragm B for setting the film sensitivity is provided. This circuit 111 serves to carry out the conventional automatic exposure control operation, whereby the meter Me is operated by means of the power source 112 in the camera in accordance with the light amount of the object to be photographed in such a manner that the movement of the meter Me is mechanically detected by a saw-tooth. The flash light exposure calculation circuit 110 serves to produce a voltage corresponding to the level of the charge completion signal to be supplied from the charge completion signal producing circuit 109. The circuit 110 consists of the transistors $Tr_1$ and $Tr_2$, the resistances $R_2$, $R_3$ and $R_{11}$, the variable resistances $R_1$ and $R_4$ and the diode $D_1$. This circuit 110 becomes operable by means of the power source 101 of the speed light device when the switch 102 is closed and is operated when the charge completion signal is applied.

Hereby the impedance between the terminals A and A' in the circuit 110 is too high for the circuit 110 to be operable when the switch 102 is open. Further, the resistance $R_1$ is a variable resistance to be varied by the distance adjustment and the film sensitivity setting, while $D_1$ is a diode for preventing the passage of a current from the power source 112 in the exposure control circuit 111 to the speed light device. The speed light device is constituted in a conventional way, whereby when the switch 102 is closed the voltage of the power source 101 is step up by means of the D.C. voltage step of circuit 103 in order to charge the main capacitor 104 while when the synchronization X contact Sx of the trigger circuit is closed a trigger pulse is produced so as to discharge the charge stored in the main capacitor 104 through the dischrarge tube 105 and to produce a flash light. By means of the voltage dividing circuit consisting of the resistances $R_7$, $R_8$ and $R_9$ the terminal voltage of the main capacitor 104 is detected, whereby the output signal is applied to the calculating circuit 110 when the neon tube 108 is lit up.

Below the operation of the circuit shown in FIG. 3 is explained. In the drawing, the output impedance (the impedance between the terminals A and A') of the calculating circuit 110 in the first exposure control circuit 111 is considerably high so that the movement of the meter Me is determined by means of the light sensing element Rx in accordance with the light amount of the object to be photographed in a conventional way, whereby the movement is mechanically detected (for example by means of a saw-tooth) so as to determine the aperture value of the lens and so on.

As to the second exposure control device, namely the device for controlling the movement of the first exposure control device by means of the signal from the speed light device, when by popping up the speed light device into the operation position the power source switch $S_1$ is closed so as to charge the main capacitor 104 up to a certain determined value, the charge voltage of the main condenser is detected by means of the voltage detecting circuit 107 and the neon tube 108 is lit up, whereby a signal (a signal corresponding to the guide number) corresponding to the voltage of the main capacitor 104 is applied to the flash light exposure calculating circuit 110 so as to bring the transistors $Tr_1$ and $Tr_2$ into the switched-on state in such a manner that the outputs of the transistors $Tr_1$ and $Tr_2$ are delivered to the meter Me of the first exposure control circuit 111 by means of the terminals A and A' through the diode $D_1$. With the circuit 110, the variable resistance $R_1$ to be varied in operable engagement with the film sensitivity setting member and the distance adjusting ring is connected in series, whereby the signal coming through the terminals A and A' corresponding to the guide number is modified by the distance measuring operation and introduced to the meter Me of the exposure meter circuit 111 in such a manner that the aperture of the lens is determined for the so called flash auto (FA). Hereby, in case of the daylight synchronization photography the meter Me is moved in accordance with the value composed out of the value of the output of the light sensing element Rx, the guide number information coming through the terminals A and A', the film sensitivity information by the resistance $R_1$ and the distance information so as to determine the aperture value. By closing the relation of the angle of the movement of the meter to the current value running through the meter to be a logarithmic one, the logarithm of the value of the total current running through the meter from the above circuits can be made to correspond to the aperture value so that a proper exposure can be obtained no matter whether the object to be photographed is bright or dark. In order to carry out a flash light photography by means of a speed light device the switch $S_1$ is closed by means of the pop-up operation in such a manner that the voltage of the main capacitor 104 reaches a value capable of producing a flash light, when the neon tube 108 becomes conductive while the transistor $Tr_1$ is brought into the switched on state by means of a current running between the base and the emitter of the transistor $Tr_1$. Thus, the collector-emitter current in the transistor $Tr_1$ is produced by means of the power source 101 for the speed light device, whereby a voltage drop takes place in the resistances $R_2$ and $R_3$. The voltage drop corresponds to the current running through the neon tube 108, whereby the value of the resistances $R_2+R_3$ has been chosen so as to correspond to the flash light amount of the speed light device. Hereby the transistor $Tr_2$ and the resistance $R_4$ serve to compensate the fluctuation of the power source voltage and of the circuit characteristics due to the temperature fluctuation, whereby the ratio of the value of the resistance $R_2$ to that of the resistance $R_3$ as well as the value of the resistance $R_4$ have been properly chosen. By applying the voltage produced in the above resistances $R_2$ and $R_3$ considered as that of an imaginary power source to the first exposure control circuit through the diode $D_1$ and the resistance $R_1$ the meter Me can operate with the signal in which the actual value of the flash light amount (guide number) of the speed light device, the film sensitivity information and the distance information are considered.

By introducing the exposure control signal from the speed light device to the first exposure control circuit in a parallel way or in a series way, the effect is different when the exposure control is carried out, the influence of the light from the object to be photographed being taken into consideration for example in case of the daylight synchronization photography. In case the control signal from the speed light device is delivered parallely to the meter Me, the current running through the meter Me is determined by means of the effect of the resistance for the above FA and of the resistance Rx of C4S connected in series with the meter so that a good result can be obtained when the speed light is used as the second light source in case the back ground around the main object to be photographed is bright.

In case of the camera in accordance with the present invention, when the brightness of the object to be photographed goes down below a range capable of daylight photography the display of the meter in the view finder enters into the low brightness alert zone while at the same time the shutter can not be released any more. Further, even when the photographer operates the knob to pop up the speed light device in order to establish a state capable of flash light photography by means of a speed light device, the shutter button is kept in the locked state until the charge voltage of the main capacitor for the speed light device reaches a certain determined level, while the aperture value of the photographic optical system is determined in accordance with the film sensitivity, the distance up to the object to be photographed and the stored charge for the speed light device.

Figure 4:
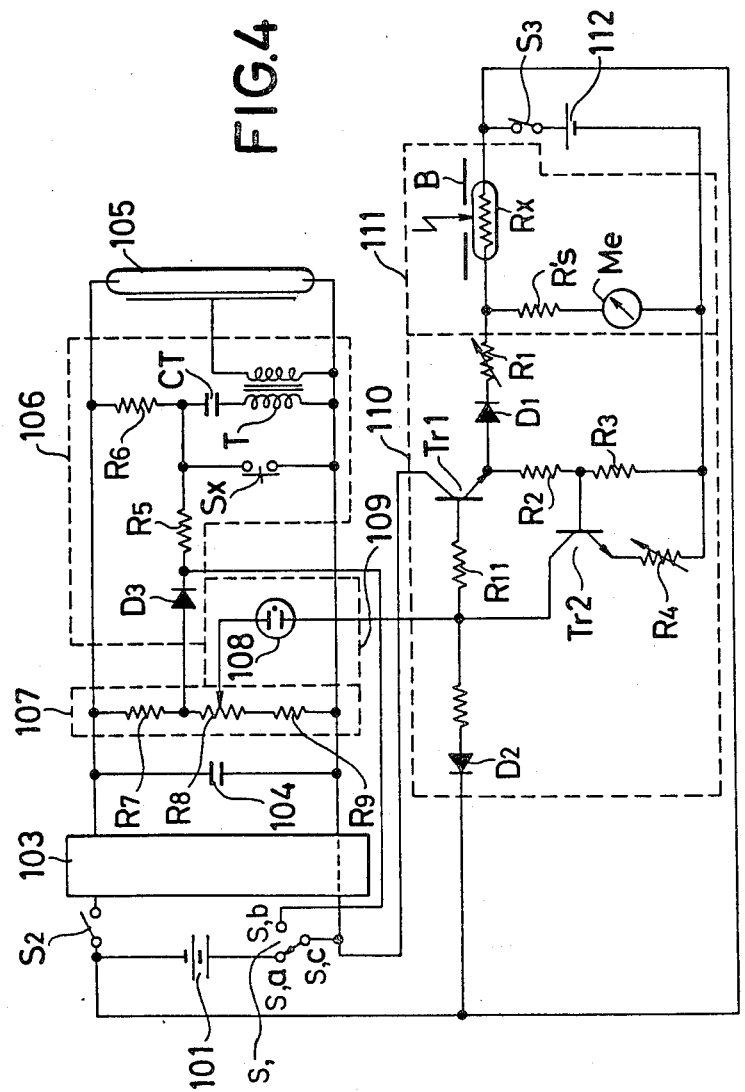
FIG. 4 shows another embodiment of the electrical circuit shown in FIG. 3.

FIG. 4 shows another embodiment of the electrical circuit of the camera containing a speed light device in accordance with the present invention. The circuit of this embodiment is almost similar to the circuit of the first embodiment shown in FIG. 3, whereby the power source switch 102 of the speed light device and the circuit of the switch $S_2$ are different. The power source $S_1$ is shown in FIG. 2. as a change over switch. Along with the popping up of the speed light device, the switch $S_1$ is connected to the contact piece $S_{1a}$, serving to supply current from the power source 101 of the speed light device to the speed light device. Along with the operation to push the speed light device into the camera body out of the above state, the switch $S_1$ is changed over from $S_{1a}$ to $S_{1b}$ in such a manner that the charge stored in the trigger condenser CT of the speed light device is discharged to the earth through the resistance $R_5$. The charge remaining in the main capacitor 104 is also discharged to the earth through the resistances of the voltage dividing circuit and the diode $D_3$ so that the speed light device is completely brought into the non-operable state. Hereby the diode $D_2$ and the resistance $R_{12}$ in the circuit 110 serve to prevent the voltage of the power source 112 from being applied to the transistors $Tr_1$ and $Tr_2$. $S_2$ is the switch to be closed along with the pulling out the winding up lever into the wait angle position (FIG. 5, 4').

Figures 5A, 5B:
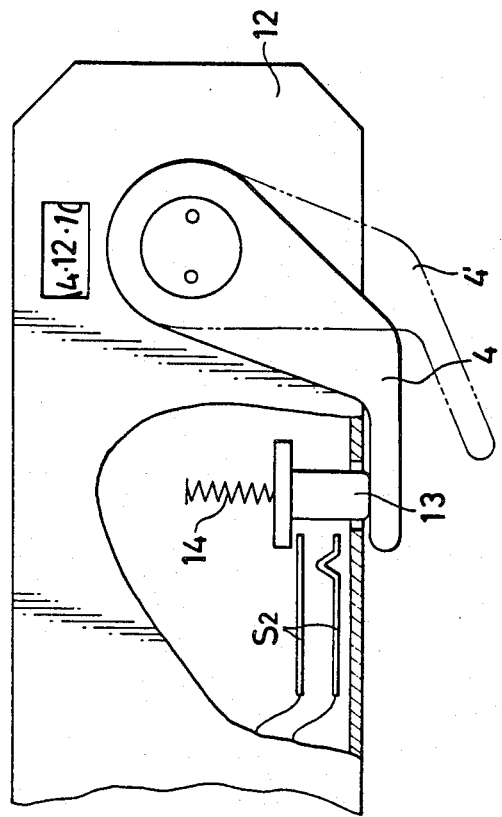
FIGS. 5A and 5B show the disposition of the switch $S_2$ shown in FIG. 4.

FIG. 5 shows the disposition of the switch $S_2$. Along with the pulling out the winding up lever 4 provided on the upper surface 12 of the camera body into the wait angle position the switch change over member 13 pushed out onto the lower surface of the camera body by means of the strength of the spring 14 so as to close the switch $S_2$. Along with the closing of the switch $S_2$ the power source 101 of the speed light device is connected to the speed light circuit, when at this time, the power source switch $S_1$ of the speed light device is connected to a the camera is in a state capable of the flash light photography. When it is desired that the camera should be brought back into a state capable of the daylight photography for a little while the speed light device is kept in the popped up state, the winding up lever 4 is brought back into the position shown in FIG. 7 out of the wait angle position while the speed light device is kept as it is, whereby the switch change over member 13 is pushed in by means of the one end of the lever 4 so as to open the switch $S_2$. Thus, the current supply to the above speed light circuit is interrupted so that the current from the imaginary power source consisting of the resistances $R_2$ and $R_3$ in FIG. 4 to the exposure meter circuit becomes zero, whereby the exposure meter circuit operate with an exposure value corresponding to the brightness of the object to be photographed.

Figure 6:
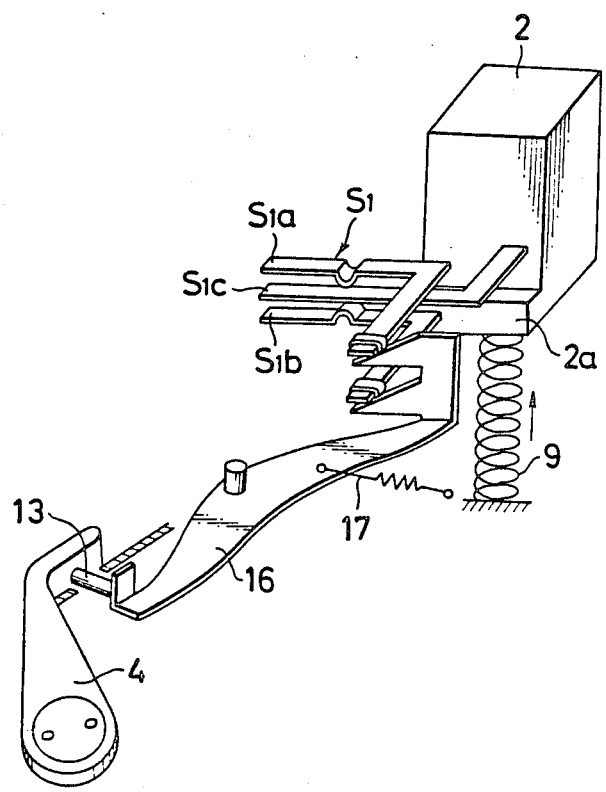
FIG. 6 shows another embodiment of the disposition of the switch shown in FIG. 4.

FIG. 6 shows another embodiment of the above switches $S_1$ and $S_2$ in accordance with the present invention, whereby the switch $S_2$ is omitted while the change over switch $S_1$ is controlled by means of the winding up lever. Along with the pulling out of the winding up lever 4 into the wait angle position in the drawing the member 13 is pushed out by means of the one end of the arm 16, which is rotated along the counter clockwise direction by means of the spring 17. Thus, the other end of the arm 16 is disengaged from the contact pieces Sa and Sb of the change over switch $S_1$, which switch closes the contact piece Sa or Sb in accordance with the position of the speed light device. In consequence, when the speed light device is in the popped up state a current is supplied to the device, while the speed light device is pushed in the current supply is interrupted and the charge in the main capacitor is discharged in such a manner that the speed light device is completely brought into the non-operable state. When now it is desired that the speed light device should be in the non-operable state while the device is kept in the popped up state, the winding up lever 4 is brought back to the side of the body out of the wait angle position, when the member 13 is pushed in whereby the lever 16 is rotated along the counterclockwise direction against the strength of the spring 17. Thus, by means of the other end of the lever 16 the change over switch S₁ is changed over from the contact piece Sa to the contact piece Sb, whereby the current supply from the power source of the speed light device is interrupted in such a manner that the speed light device is brought into the non-operable state, when the camera is in the state capable of daylight photography. In the state in which the speed light device is pushed down, the switch S₄ is in contact with the contact piece Sb, whereby the current supply to the speed light device is interrupted regardless of the position of the winding up lever. In the circuit shown in FIG. 4, the above switch circuit and the capacitor charge discharging circuit of the speed light device are omitted, while other circuits are same as those in FIG. 3, so that the explanation of the composition and the operation will be omitted here.

As explained above in case of the camera incorporated with a speed light device in accordance with the present invention, the speed light device can automatically be made ready for the flash light photography by popping up the speed light device, while the proper exposure can automatically be controlled, the exposure device of the camera being operatively associated with the informations necessary for the flash light photography so that the state ready for the flash light photography can be confirmed by means of the meter display in the view finder. At the same time, the current supply can be interrupted by means of the operation of the winding up means even when the speed light device is in the popped up state. Further, the camera presents many other features which are quite profitable to the operation of the camera. Hereby all of the afore mentioned embodiments relate to the system in accordance to which the exposre meter circuit is controlled by detecting the flash light amount of the flash light device. However, the present invention is not always limited to the above system, whereby it is also possible to use a speed light device of the automatic light adjusting system.

We claim:
1. A flash device for a camera, comprising:
a discharge tube for flashing;
a main capacitor for supplying illumination energy to the discharge tube;
detecting means for detecting the charge voltage of the main capacitor, said means having charge completion indicating means for indicating that the charging of the main capacitor is completed;
trigger means for triggering the discharge tube to illuminate, said trigger means having a trigger capacitor;
first connecting means for electrically connecting the detecting means to the trigger capacitor of the trigger means;
a power source for charging the main capacitor;
a power source switch for connecting the power source to a ground line, said switch being changeable between a first position for connecting the power source to the ground line to complete a power supply circuit and a second position for disconnecting the power source to the ground line to inhibit completion of a power supply circuit; and
second connecting means for electrically connecting the first connecting means to the second position of the power source switch, said second connecting means connecting the first connecting means to the ground lien to form a short-circuit between the trigger capacitor and the detecting means when the power source switch is switched to the second position.

2. A flash device for a camera, comprising:
a flash discharge tube;
a main capacitor for supplying illuminating energy to the discharge tube;
detecting means for detecting the charge on said main capacitor and for indicating that charge of the main capacitor is complete;
trigger means for triggering the discharge tube so as to effect illumination, said trigger means including a trigger capacitor;
first connecting means for electrically connecting the detecting means to the trigger capacitor;
circuit means for charging the main capacitor;
a power switch changeable between a first position for grounding said circuit means so as to activate said circuit means, and a second position for ungrounding the circuit means and for deactivating the circuit means; and
second connecting means for electrically connecting the first connecting means to the second position of said power switch, said second connecting means being arranged for grounding the first connecting means so as to form a short-circuit between the trigger capacitor and the detecting means when the power switch is switched to the second position.

3. A camera incorporating a movable flash device comprising:
a camera body;
a flash device movably built in the camera body, said flash device including a discharge tube for producing a flash for an object to be photographed, said discharge tube being movable between a protruding position in which the discharge tube protrudes from the camera body and a stowed position in which the discharge tube is stowed in the camera body;
a main capacitor for supplying flash energy to the discharge tube;
detecting means for detecting a charge voltage of the main capacitor and for producing a charge completion signal when the charge voltage of the main capacitor has reached or exceeds a given value;
AND gate means for generating a control signal when said charge completion signal and an operation signal are applied thereto;
signal generating means for generating the operation signal, said means having a switch changeable between a first position and a second position and the operation signal being generated when the switch is at the first position and being prevented when the switch is at the second position; said switch being arranged to be shifted to the first position when said flash device has moved to said protruding position and to the second position when said flash device is moved to said stowed position;
natural light photographic exposure control means for producing an electrical signal corresponding to the brightness of the object to be photographed;

flash photographic exposure control means for producing an electrical signal corresponding to the brightness of the object to be photographed;

flash photographic exposure control means for producing an electrical signal in response to the control signal produced by said AND gate means; and exposure determining means for determining an exposure in accordance with the electrical signal from said natural light photographic exposure control means and the electrical signal from said flash photographic exposure control means.

4. A camera incorporating a movable flash device therein, comprising:

a camera body;

a flash device movably built in the camera body, said device including a discharge tube for producing a flash for an object to be photographed, the discharge tube being movable between a protruding position in which the discharge tube protrudes from the camera body and a stowed position in which the discharge tube is stowed in the camera body;

first conductive means connectable to a first power source;

a main capacitor arranged to be charged through said first conductive means for supplying flash energy to the discharge tube;

detecting means for detecting a charge voltage of the main capacitor and for producing a charge completion signal when the charge voltage of the main capacitor has reached or exceeded a given value;

AND gate means for generating a control signal when said charge completion signal and an operaton signal are added thereto;

signal generating means which is supplied with power from said first conductive means and generates the operation signal, said signal generating means having a switch changeable between a first position and a second position, the operation signal being generated when the switch is at the first position and being prevented from being generated when the switch is at the second position; said switch being arranged to be shifted to the first position when said flash device has moved to said protruding position and to the second position when said flash device is moved to said stowed position;

second conductive means for connection to a second power source;

natural light photographic exposure control means for producing an electrical signal corresponding to the brightness of the object to be photographed, said means being arranged to have a voltage at said second conductive means applied thereto;

flash photographic exposure control means arranged to have the control signal of said AND gate means applied thereto and to produce an electrical signal in response to the control signal produced by said AND gate means; and exposure determining means for determining the exposure in accordance with the electrical signal from said natural light photographic exposure control means and the electrical signal from said flash photographic exposure control means.

5. A camera according to claim 4, wherein said AND gate means is provided with voltage producing means for producing a voltage corresponding to the charge completion signal from said detecting means, and compensating means for compensating for fluctuation of the voltage of said voltage producing means; and said voltage producing means being arranged to have power supplied from said first conductive means when said switch is in the first position.

6. A camera according to claim 4, wherein said flash photographic exposure control means includes a unidirectional conductor element which is arranged in a direction in which the electrical signal responding to said control signal is applied to said exposure determining means.

7. A camera incorporating a movable flash device therein, comprising:

a camera body;

a flash device slidably built in the camera body, said device including a discharge tube for producing a flash for an object to be photographed, the discharge tube being movable between a protruding position in which the discharge tube protrudes from the camera body and a stowed position in which the discharge tube is stowed in the camera body;

first conductive means connectable to a first power source;

a main capacitor for supplying flash energy to the discharge tube, said main capacitor being arranged to be charged by said first power source;

detecting means for detecting a charge voltage across the main capacitor and for producing a charge completion signal when the charge voltage across the main capacitor has reached or exceeded a given value;

AND gate means for generating a control signal when said charge completion signal and an operation signal are added thereto;

signal generating means for generating the operation signal, said means having a switch changeable between a first position and a second position, and the operation signal being generated when the switch is at the first position and being prevented from being generated when the switch is at the second position, said switch being arranged to be shifted to the first position when said flash device has moved to said protruding position and to the second position when said flash device is moved to said stowed position;

a holding member movable between a position in which said switch is rendered shiftable and another position in which said switch is held in the second position;

an operating member for controlling the movement of said holding member, said operating member being operative to move between a first operating position in which said holding member is placed into the position to render said switch shiftable and a second postion in which said holding member is placed into the other position for holding the switch in the switch's second position;

second conductive means connectable to a second power source;

natural light photographic exposure control means for producing an electrical signal corresponding to the brightness of the object to be photographed, said means being arranged to have a voltage at said second conductive means applied thereto;

flash photographic exposure control means arranged to have the control signal of said AND gate means applied and to produce an electrical signal corresponding to flash conditions in response to the control signal produced by said AND gate means; and exposure determining means for determining an exposure in accordance with the electrical signal from said natural light photographic exposure control means and the electrical signal from said flash photographic exposure control means.

8. A camera incorporating a movable flash device therein, comprising:

a camera body;

a flash device movably built in the camera body, said device including a discharge tube for producing a flash for an object to be photographed, the discharge tube being movable between a protruding position in which the discharge tube is protruding from the camera body and a stowed position in which the discharge tube is stowed in the camera body;

first conductive means connectable to a first power source;

a main capacitor for supplying flash energy to the discharge tube, said main capacitor being arranged to be charged from said first conductive means when said first conductive means are connected to said first power source;

detecting means for detecting a charge voltage of the main capacitor and for producing a charge completion signal when the charge voltage of the main capacitor has reached or exceeded a given value;

AND gate means for generating a control signal when said charge completion signal and an operation signal are added thereto;

signal generating means for generating the operation signal, said means having a switch changeable between a first position and a second position, and the operation signal being generated when the switch is at the first position and being prevented from being generated when the switch is at the second position, said first switch being arranged to be shifted to the first position when said flash device has moved to said protruding position and to the second position when said flash device is moved to said stowed position;

a second switch interposed in between the first conductive means and the main capacitor;

a holding member movable between a position in which said second switch can be opened and another position in which said second switch can be held in an open position;

an operating member for controlling the movement of said holding member, said operating member being operative to move between a first operating position in which said holding member is set into the openable position and a second operating position in which said holding member is set into the holding position;

second conductive means connectable to a second power source;

natural light photographic exposure control means for producing an electrical signal corresponding to the brightness of the object to be photographed, said means being arranged to have a voltage of said second power source applied thereto;

flash photographic exposure control means arranged to have the control signal of said AND gate means applied thereto and to produce an electrical signal corresponding to flash conditions in response to the control signal produced by said AND gate means; and exposure determining means for determining an exposure in accordance with the electrical signal from said natural light photographic exposure control means and the electrical signal from said flash photographic exposure control means.

* * * * *